United States Patent [19]
Dishun

[11] 3,967,501
[45] July 6, 1976

[54] SLAG LEVEL DETECTION SYSTEM

[75] Inventor: Thomas R. Dishun, Middletown, Ohio

[73] Assignee: Armco Steel Corporation, Middletown, Ohio

[22] Filed: June 19, 1974

[21] Appl. No.: 480,614

[52] U.S. Cl. ............................................. 73/304 C
[51] Int. Cl.² ........................................ G01F 23/26
[58] Field of Search ...................... 73/304 R, 304 C; 222/DIG. 15, DIG. 21; 164/335; 266/36 P

[56] References Cited
FOREIGN PATENTS OR APPLICATIONS

| 1,236,809 | 3/1967 | Germany | 73/304 R |
| 1,056,032 | 1/1967 | United Kingdom | 73/304 R |
| 781,056 | 8/1957 | United Kingdom | 73/304 R |

Primary Examiner—Richard E. Aegerter
Assistant Examiner—Willis Little
Attorney, Agent, or Firm—Melville, Strasser, Foster & Hoffman

[57] ABSTRACT

Improved slag level detecting means wherein the sensing probes which generate an electrical potential across the slag metal interface are mounted beneath and in vertical alignment with the axis of the ladle trunnions to provide an accurate indication of metal level even when the ladle is tilted, the system including readily replaceable probes, electronic control means located remote from the ladle, as in the crane cab, and a cable and sheath assembly which can be quickly connected and disconnected relative to the ladle probes and is protected from the hostile environment of the ladle.

14 Claims, 7 Drawing Figures

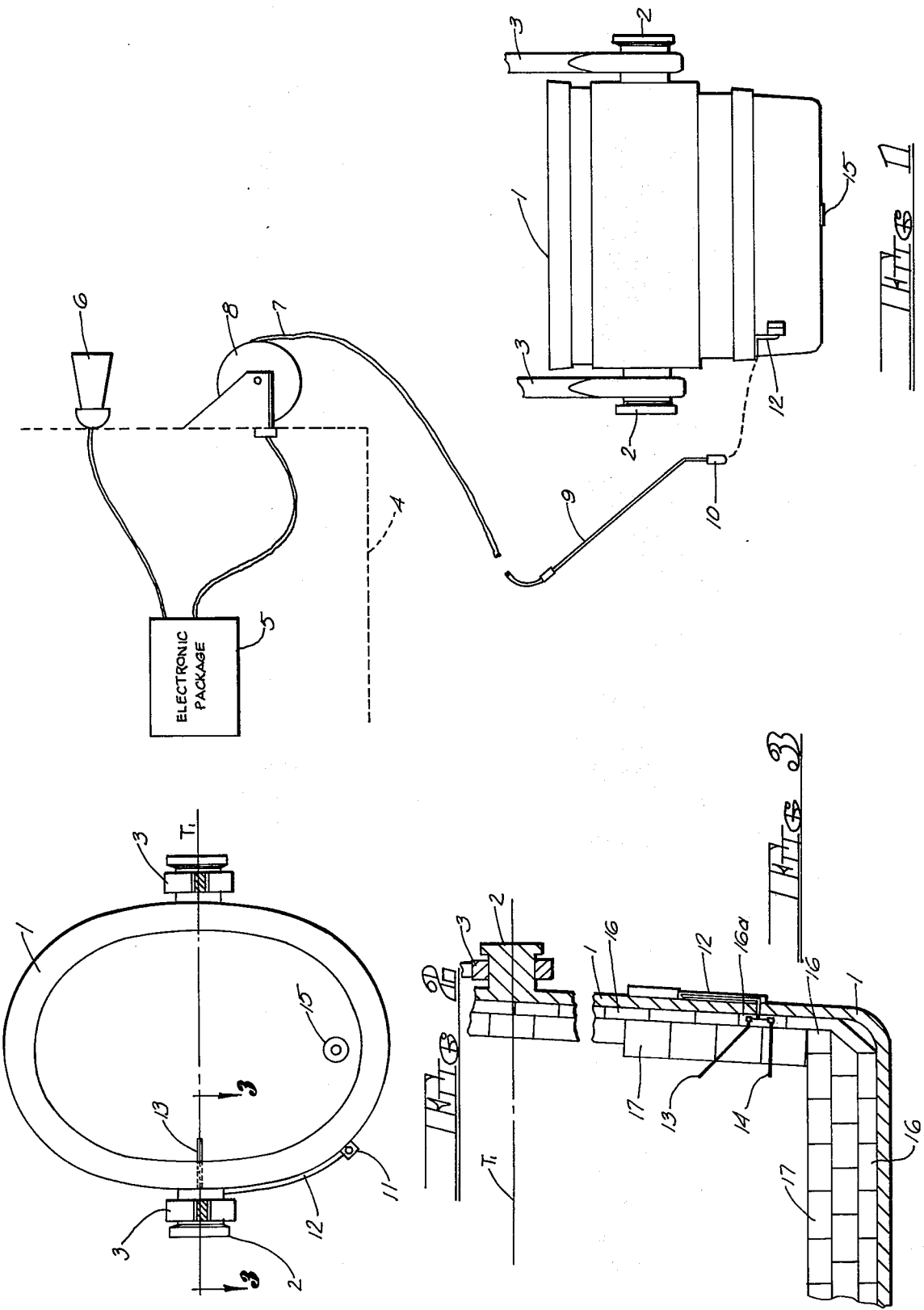

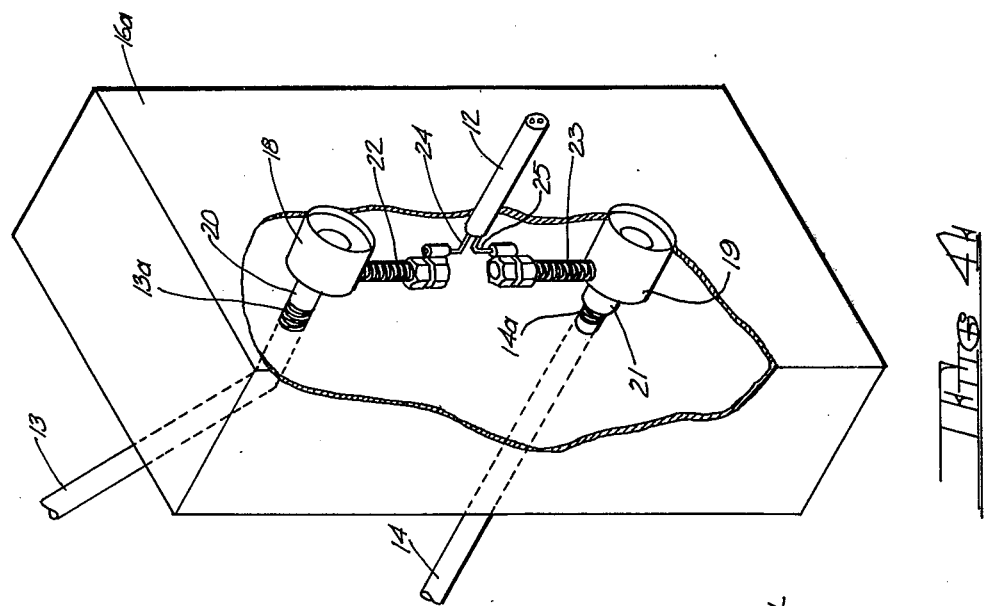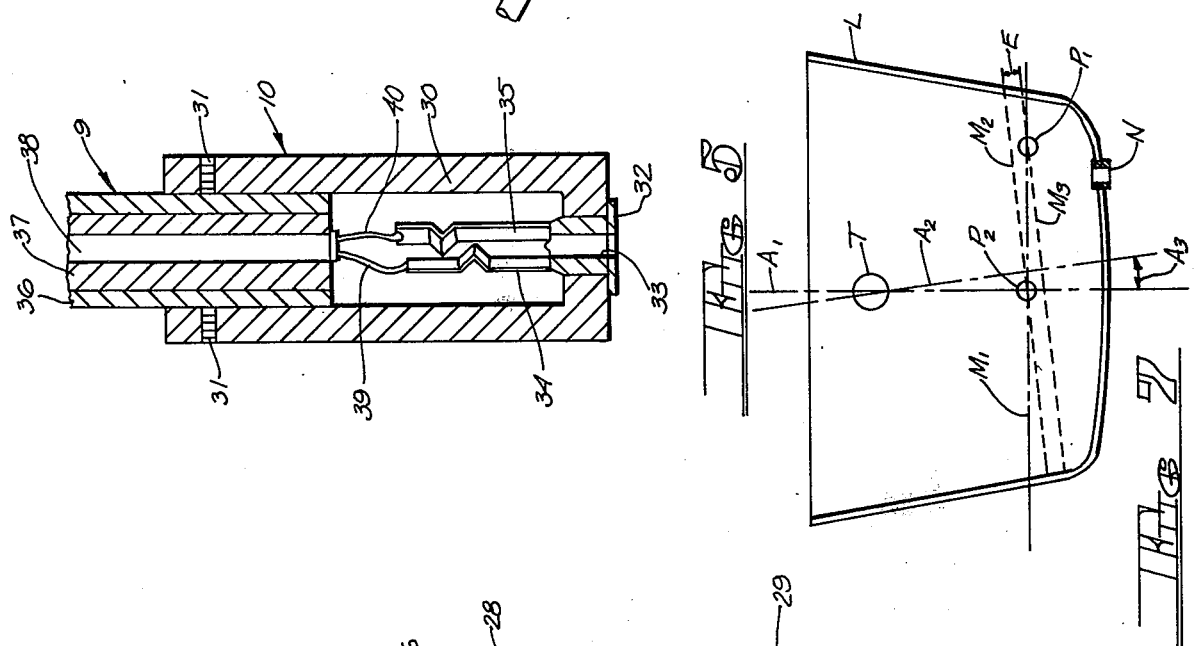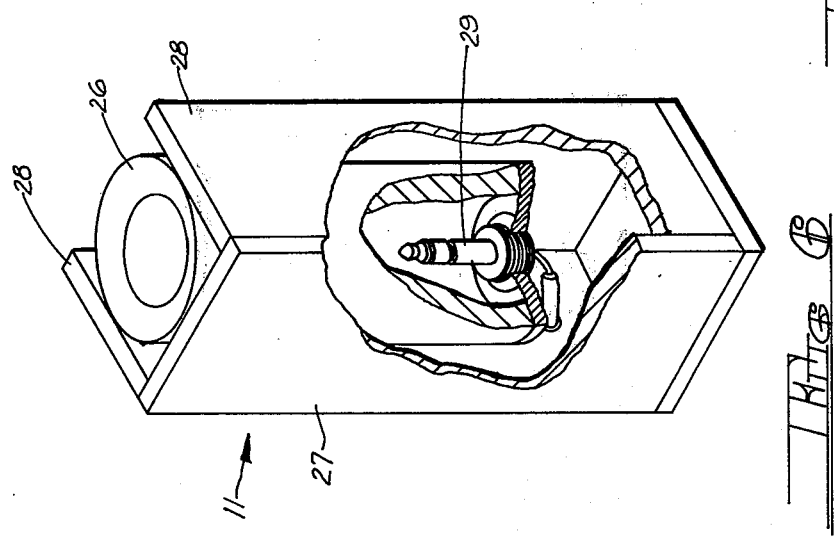

3,967,501

SLAG LEVEL DETECTION SYSTEM

BACKGROUND OF THE INVENTION

The present invention relates to the casting of molten metal from ladles into ingot molds, and has to do more particularly with means for measuring the molten metal level in ladles and for detecting the approach of slag toward the nozzle of the ladle so that slag contamination of the ingots being poured can be effectively eliminated.

It has hitherto been proposed to detect the slag-metal interface by means of a pair of electrodes or probes mounted in the ladle wall one above the other in close proximity to the teeming nozzle. When both probes are in contact with molten metal, virtually no potential is present across the probes; but as the metal level recedes, a level is reached when the upper probe is in contact with the slag and the lower probe is still in contact with the molten metal. This results in a potential across the probes which is used to operate a signal instrument which is hung on the ladle during teeming. The probes are positioned so that the signal will occur when a predetermined metal level has been reached in the ladle, whereupon, when the alarm sounds, the quantity of metal remaining in the ladle can be calculated and a determination made if and when a trailer ingot should be poured to avoid an unrollable butt.

Numerous difficulties have been encountered with systems of the character described. In particular, the systems are unreliable and give a faulty indication of metal depth if the ladle is tilted. Numerous operational and maintenance problems were encountered due to the handling of the electronic package which had to be hung on each ladle during the teeming operation, as well as the hostile environment encountered by the electronic package when hung on the ladles. In addition, the electronic packages were battery operated and subject to rapid battery deterioration and failure. The probes themselves are subject to rapid deterioration and must be replaced frequently. Heretofore, the probes were inserted through holes drilled through the ladle shell, tank, and the working lining, the outwardly projecting ends of the rods being connected to the electronic package by alligator clips. With such arrangement, it is difficult to make reliable electrical connections between the probes and the electronic package.

In contrast to the foregoing, the present invention provides an improved slag level detecting system which effectively eliminates the numerous difficulties encountered with the systems formerly in use, and provides a system which is accurate, as well as easy to maintain and service.

RESUME OF THE INVENTION

In accordance with the present invention, the level detecting probes, instead of being positioned adjacent the teeming opening in the bottom of the ladle, are positioned beneath and in vertical alignment with the axis of the ladle trunnions. Such positioning of the sensing probes minimizes errors in the system resulting when the ladle is lifted offcenter, i.e., tilted relative to its vertical axis, which can occur during the teeming operation.

An illustration of how these errors occur is illustrated in FIG. 7 of the drawings. As seen therein, when the ladle L is level, with its axis $A_1$ extending vertically, the level of the metal in the ladle, indicated by the line $M_1$, will be horizontal and an accurate reading will be obtained by the probes $P_1$ which are positioned adjacent the teeming nozzle N. If, however, the ladle is tilted about its trunnions T, its vertical axis, indicated by the line $A_2$, will be tilted from the vertical by the angle $A_3$, and the level of metal in the ladle will lie along line $M_2$ when the ladle is so tilted. The probes $P_1$ will be completely immersed and will not respond until the liquid level has dropped to the line $M_3$; consequently the probe $P_1$ will give a false indication of the quantity of metal remaining in the ladle, the false reading being indicated by the distance E between the lines $M_2$ and $M_3$.

If, however, as in accordance with the invention, the probes $P_2$ are positioned in vertical alignment with the axis of the trunnions T, which vertical alignment is also indicated by the line $A_1$, it will be evident that an accurate reading of metal level will be obtained irrespective of whether the metal lies along the line $M_1$ or the line $M_2$. and this is true irrespective of the direction in which the ladle is tilted about the axis of its trunnions. Accordingly, a principal feature of the present invention is the positioning of the probes in vertical alignment with the axis of the ladle trunnions in order to insure an accurate indication of the level of metal in the ladle irrespective of whether or not the ladle is tilted.

The present invention also contemplates the removal of the electronic package from the ladle itself, preferably to a remote area where it will be free from the hostile environmental conditions encountered at or near the ladle. In a preferred embodiment of the invention, the electronic package is installed in the cab of the overhead crane by means of which the ladles are moved into position over the ingot molds for teeming, a retractable cable being utilized to operatively connect the electronic package to the probes. The invention also contemplates the provision of quick connect-disconnect means for quickly and realiably connecting the cable to the probes, including an insulated wand which projects outwardly away from the ladle and protects the cable from the hostile environment immediately adjacent the ladle as well as provides the ladleman with a convenient handle for reliably connecting the parts.

The present invention additionally contemplates a special ladle tank lining brick which mounts threaded inserts adapted to receive the probes, the probes being readily replaceable as an incident of the replacement of the working lining in the ladle simply by unscrewing the used probes and threading a new set in place.

The foregoing objects of the invention, together with others which will appear hereinafter or which will be apparent to the worker in the art upon reading this specification, are accomplished by that construction and arrangement of parts of which the preferred embodiment will now be described in detail.

DESCRIPTION OF THE DRAWINGS

FIG. 1 is a diagrammatic elevational view of a slag level detecting system in accordance with the present invention.

FIG. 2 is a plan view of the ladle illustrated in FIG. 1.

FIG. 3 is an enlarged fragmentary vertical sectional view taken along the line 3—3 of FIG. 2.

FIG. 4 is an enlarged fragmentary perspective view with parts broken away of a tank lining brick incorporating threaded probe mounting inserts.

FIG. 5 is a vertical sectional view of the male part of the quick connect-disconnect means.

FIG. 6 is an enlarged perspective view with parts broken away of the female part of the quick connect-disconnect means.

FIG. 7 is a schematic illustration of a ladle showing the relationship between probe placement and metal level.

DESCRIPTION OF THE PREFERRED EMBODIMENT

Referring first to FIG. 1 which illustrates the general organization of the system, the ladle 1, which is of essentially conventional construction, is provided with an opposing pair of trunnions 2 which are engaged by crane hooks 3 by means of which the ladle is moved from place to place. The cab of the crane is diagrammatically indicated at 4, the cab containing the electronic package 5 which contains circuitry for generating an electrical potential as well as detecting variations in the potential and energizing a signal, such as the horn 6. An electrical cable 7, preferably wound on a cable reel 8, serves to connect the electronic package 5 to the ladle.

At its free end, the cable 7 is provided with an elongated metal rod or wand 9 having a male connector 10 at its free end adapted to be inserted in the coacting female connector 11 mounted on the ladle 1. An electrical conduit 12 connects the female connector 11 to the probes or electrodes 13 and 14, best seen in FIG. 3, which extends into the interior of the ladle. As will be evident from FIGS. 2 and 3, the probes lie one beneath the other in close proximity to the bottom of the ladle and in vertical alignment with the axis of the trunnions 3, which axis is indicated by the line $T_1$. As also will be evident, the ladle may rotate or tilt about the axis $T_1$ of the trunnions 2 in opposite directions, i.e., either toward or away from the teeming nozzle 15.

As seen in FIG. 3, the ladle is lined with the lining bricks 16 which are essentially permanent, the lining bricks in turn being lined with additional bricks 17 which form the so-called working lining which must be replaced as it is eroded away by the molten metal.

In accordance with the present invention, the probes 13 and 14, which are usually steel rods, are adapted to extend through the replaceable work lining 17 with their innermost ends engaging a specially designed lining brick 16a which, as seen in FIG. 4, incorporate a pair of steel conductors 18 and 19 which are embedded in the brick 16a, the conductors having internally threaded heads 20 and 21, respectively, which receive the threaded inner ends 13a and 14a of the probes. The conductors 18 and 19 include threaded posts 22 and 23 to which the conductor wires 24 and 25 of electrical conduit 12 are attached. The conduit 12 extends through an opening in the ladle wall and, as previously indicated, is connected at its opposite end to the female connector 11.

The conductors 18 and 19 and their related parts are preferably molded in the lining brick 16a, and it will be evident that the electrodes 13 and 14 may be readily replaced as an incident of replacing the working lining 17 by unscrewing the probes and threading a new set into the conductors. In the event the lining brick 16a is also damaged, it may be replaced by a new brick incorporating the conductor assembly.

Referring next to FIG. 6, the female conductor 11, which is mounted on the outer wall surface of the ladle, comprises an elongated socket 26 enclosed within a protective housing 27 the free side edges 28 of which may be welded directly to the side of the ladle. A two-pole conductor pin 29 projects freely upwardly from the bottom of the socket 26, the conductor wires of electrical conduit 12 being electrically connected to different segments of the conductor pin 29, as will be understood by the worker in the art.

The socket 26 is adapted to receive the male connector 10 attached to the free end of the wand 9. As seen in FIG. 5, the male connector comprises a hollow cylindrical body 30 of a size to be snugly received in socket 26, the hollow interior of the body being of a size to snugly receive the wand 9, the cylindrical body being fixedly secured to the wand by means of set screws 31. The free end of the body 30 mounts a fitting 32 having an axial bore 33 through which the conductor pin 29 passes when the cylindrical body 30 is inserted and seated in socket 26. The fitting 32 mounts a pair of conductor fingers 34 and 35 each adapted to make contact with one of the pole defining segments of the conductor pin 29.

The wand 9, in addition to providing a convenient elongated handle by means of which the male connector 10 may be readily inserted in the female connector 11, is preferably constructed to protect the electrical wiring against the hostile environment adjacent the ladle. In the embodiment illustrated, the wand has an outer jacket 36 comprising a seamless stainless steal pipe, an inner tubular jacket 37 formed from a high nickel-chrome iron alloy tubing, such as Inconel tubing, manufactured by International Nickel Co. The inner jacket 37 is filled with a dielectric material 38, such as magnesium oxide, which surrounds and insulates the conductor wires 39 and 40 which are connected to the conductor fingers 34 and 35, respectively. Preferably, the inner jacket, the magnesium oxide and the conductor wires will comprise a swaged aasembly which is inserted into the outer jacket 36.

As should now be apparent, the instant invention provides an improved slag level detecting system which will give an accurate indication of the metal level in the ladle irrespective of the position of the ladle, and at the same time provides quick connect-disconnect means for connecting the probes to a remote electronic package. In addition, the probes are readily replaceable as an incident of ladle maintenance. The electronic package as such does not constitute a limitation on the invention. Essentially, the electronic package will comprise circuit means for generating a signal voltage to monitor the system prior to and during operation, means for detecting a potential difference in the voltage when the lower probe is immersed in the molten metal and the upper probe is in contact with the swag blanket overlying the molten metal, together with circuit means for filtering and amplifying the signal voltage and using it to trigger an alarm which will indicate to the steel pourer that a specific volume of molten metal remains in the ladle.

It will be understood that variations and modifications may be made in the invention without departing from its spirit and purpose, and it is not intended that the scope of the invention be limited other than in the manner set forth in the claims which follow.

The embodiments of the invention in which an exclusive property or privilege is claimed are defined as follows:

1. In a slag level detection system, a bottom pouring ladle having a teening opening in its bottom for discharging molten metal therefrom and an opposing pair of axially aligned trunnions for suspending said ladle in a normally vertically disposed position, the vertical axis of the ladle intersecting the axis of the trunnions, said ladle being tiltable about the axis of its trunnions from its normally vertical position, probe means mounted in the wall of the ladle beneath said trunnions, said probe means lying in the plane defined by the axis of said trunnions and the vertical axis of the ladle, whereby said probe means is positioned to accurately detect the level of molten metal in the ladle irrespective of whether the ladle is in its normally vertical position or in a tilted position.

2. The slag level detection system claimed in claim 1 including a first connector means mounted on the outer surface of said ladle and operatively connected to said probe means, a second connector means operatively connected by electrical wiring to a remote electronic package, said first and second connector means comprising quick connect-disconnect male and female connectors acting, when interengaged, to operatively connect said probe means to said remote electronic package.

3. The slag level detection system claimed in claim 2 wherein said second connector means is mounted on the end of an elongated wand adapted to project away from the ladle when the male and female connectors are interconnected, said wand surrounding and enclosing the electrical wiring to provide a protective sheath for the wiring in the vicinity of the ladle and also acting as a handle for connecting and disconnecting said male and female connectors.

4. The slag level detection system claimed in claim 3 wherein said wand comprises an outer steel jacket, an inner jacket of a high nickel-chromium iron alloy, and a dielectric core encasing the electrical wiring.

5. The slag level detection system claimed in claim 4 wherein said dielectric core comprises magnesium oxide, and wherein said inner jacket, said magnesium oxide and the encased electrical wiring comprises a swaged assembly.

6. The slag level detection system claimed in claim 3 wherein said wand is connected at its end remote from said second connector to a flexible cable containing said electrical wiring.

7. The slag level detection system claimed in claim 6 wherein said electronic package is located in the cab of a crane from which the ladle is suspended, and wherein said cable is retractably mounted on a cable reel on the crane cab.

8. The slag level detection system claimed in claim 1 wherein said probe means comprises a spaced apart pair of elongated probes mounted one above the other.

9. The slag level detection system claimed in claim 8 wherein said ladle is lined with lining bricks, wherein one of said lining bricks encloses a pair of threaded electrical conductors, said probes having threaded inner ends in threaded engagement with said electrical conductors.

10. In a slag level detection system, a bottom pouring ladle having a teening opening in its bottom for discharging molten metal therefrom and an opposing pair of axially aligned trunnions for suspending said ladle in a normally vertically disposed position, said ladle being tiltable about the axis of said trunnions, a spaced apart pair of elongated probes projecting inwardly from the inner wall surface of the ladle adjacent its bottom, said probes being in vertical alignment with each other and in vertical alignment with the axis of said trunnions, and means operatively connecting each of said probes to an electrical connector mounted on the outer wall surface of said ladle, whereby said probes will accurately detect the level of molten metal on the ladle irrespective of whether the ladle is in a vertical or tilted position.

11. The slag level detection system claimed in claim 10 wherein said ladle is lined with lining bricks, wherein the means operatively connecting said probes to an electrical connector mounted on the outer wall surface of the ladle comprises one of said lining bricks, said last named lining brick containing a pair of electrical connectors, and means detachably connecting said probes to said last named electrical connectors.

12. The slag level detection system claimed in claim 11 wherein the means detachably connecting the probes to the electrical connectors contained within said lining brick comprise threaded sockets on said connectors and mating threaded inner end portions on said probes.

13. The slag level detection system claimed in claim 12 wherein the electrical connector mounted on the outer wall surface of said ladle comprises a female socket member surrounded by a protective housing.

14. The slag level detection system claimed in claim 12 including a male connector member adapted to be inserted in said socket member, said male connector member being mounted on the end of an elongated wand adapted to project away from said ladle when said male connector member is inserted in said socket member.

* * * * *